United States Patent
Mei et al.

(10) Patent No.: US 7,572,543 B2
(45) Date of Patent: Aug. 11, 2009

(54) SUPPORTED CATALYST AND FUEL CELL

(75) Inventors: Wu Mei, Yokohama (JP); Jun Tamura, Yokohama (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 269 days.

(21) Appl. No.: 11/512,207

(22) Filed: Aug. 30, 2006

(65) Prior Publication Data
US 2007/0003823 A1   Jan. 4, 2007

Related U.S. Application Data

(63) Continuation of application No. PCT/JP2006/312930, filed on Jun. 22, 2006.

(30) Foreign Application Priority Data
Jun. 23, 2005  (JP) ............................... 2005-183714

(51) Int. Cl.
*H01M 4/00* (2006.01)
(52) U.S. Cl. ................... 429/44; 502/321; 502/305; 502/349; 502/325; 502/350; 502/355; 502/353; 502/240
(58) Field of Classification Search ............... 429/44; 502/321, 305, 349, 325, 350, 355, 353, 240
See application file for complete search history.

(56) References Cited

U.S. PATENT DOCUMENTS

| | | | | |
|---|---|---|---|---|
| 3,480,479 A | * | 11/1969 | Nestor | ............... 429/13 |
| 6,183,894 B1 | | 2/2001 | Adzic et al. | |
| 6,787,500 B2 | | 9/2004 | Ito | |
| 6,902,845 B2 | * | 6/2005 | Tani et al. | ............... 429/218.2 |
| 2003/0004054 A1 | | 1/2003 | Ito et al. | |
| 2004/0072061 A1 | * | 4/2004 | Nakano et al. | ............... 429/44 |
| 2006/0269824 A1 | * | 11/2006 | Hampden-Smith et al. | .... 429/40 |

FOREIGN PATENT DOCUMENTS

| | | |
|---|---|---|
| JP | 1997-167620 | 6/1997 |
| JP | 2003-80077 | 3/2003 |
| JP | 2004-73991 | 3/2004 |
| JP | 2004-95263 | 3/2004 |
| WO | WO 01/48839 A2 | 7/2001 |

OTHER PUBLICATIONS

U.S. Appl. No. 12/050,397, filed Mar. 18, 2008, Nakano, et al.

* cited by examiner

*Primary Examiner*—Melvin C Mayes
*Assistant Examiner*—Michael Forrest
(74) *Attorney, Agent, or Firm*—Oblon, Spivak, McClelland, Maier & Neustadt, P.C.

(57) ABSTRACT

A supported catalyst includes an oxide carrier, catalyst particles supported on the oxide carrier, and catalyst layers which locate among the catalyst particles, with interface portions among the oxide carrier, the catalyst particles and the catalyst layers. The catalyst layers have a melting point lower than 1,500° C. and contain an oxide or a composite oxide which includes at least one element selected from the group consisting of Mo, W, Sn and Ru.

20 Claims, 2 Drawing Sheets

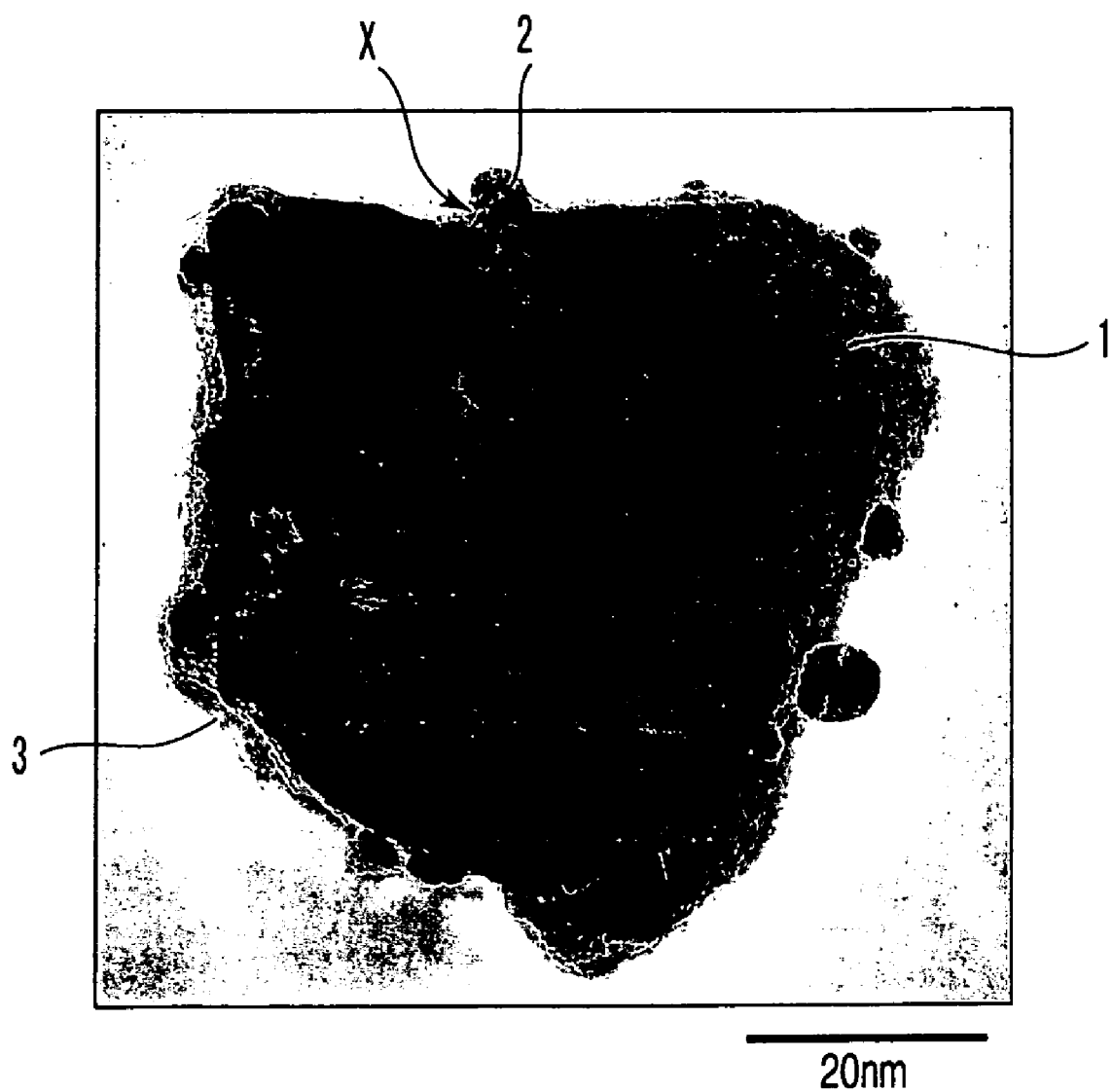
F I G. 3

SUPPORTED CATALYST AND FUEL CELL

CROSS-REFERENCE TO RELATED APPLICATIONS

This is a Continuation Application of PCT Application No. PCT/JP2006/312930, filed Jun. 22, 2006, which was published under PCT Article 21(2) in English.

This application is based upon and claims the benefit of priority from prior Japanese Patent Application No. 2005-183714, filed Jun. 23, 2005, the entire contents of which are incorporated herein by reference.

BACKGROUND OF THE INVENTION

1. Field of the Invention

The present invention relates to a supported catalyst and to a fuel cell.

2. Description of the Related Art

Polymer electrolyte membrane fuel cells permit miniaturization and weight reduction of the fuel cell, compared with the other fuel cells and, thus, vigorous effort is being made in an attempt to develop polymer type fuel cells as power sources for use in spaceships. In recent years, extensive research has been made on polymer electrolyte membrane fuel cells as power sources for use in vehicles and mobile equipment.

The polymer electrolyte membrane fuel cell comprises a membrane electrode assembly (MEA) that is used as an electromotive section. The MEA is of a laminate structure comprising an anode diffusion layer (a so-called "current collector"), an anode catalyst layer (a so-called "fuel electrode"), a proton conductive membrane, a cathode catalyst layer (a so-called "oxidizing electrode") and a cathode diffusion layer (a so-called "current collector"), which are laid one on another in the order mentioned. The catalyst layers contain catalytically active substance, conductive substance, and proton conductive substance, and have fine pores. For a supported catalyst comprising a conductive substance used as a carrier, the catalyst layers contain supported catalyst and proton conductive substance and have fine pores.

Mixed fuel containing organic fuel, such as methanol, and water is supplied to the anode catalyst layer. On the other hand, air (oxygen) is supplied to the cathode catalyst layer. If the mixed fuel and air are simultaneously supplied to the anode catalyst layer and the cathode catalyst layer, respectively, a catalytic reaction takes place on the surface of the catalyst contained in the anode catalyst layer and cathode catalyst layer. The catalytic reaction generates protons in the fuel electrode. The protons migrate into the proton conductive membrane, while electrons migrate into the anode diffusion layer. In the oxidizing electrode, the electrons supplied from the cathode diffusion layer, the protons supplied from the proton conductive membrane, and oxygen react. As a result, electric current flows between the pair of the current collectors. However, the output performance of the fuel cell is low, especially at temperatures lower than 100° C. This inhibits the wide use of the fuel cell. The low output performance of the fuel cell is attributed mainly to the low activity of the catalyst material. This is why an intensive study is now made on catalyst materials for use in the fuel cell.

To improve the catalytic activity of the catalyst material, the alloying with other transition metals and the change of carrier are proposed. Most alloys containing a transition metal have low electrochemical stability and are thus difficult for practical use. On the other hand, oxides or composite oxides have good durability. Oxides are therefore used as carrier materials to support the catalyst material or used as catalyst promoter of the catalyst material. In the latter case, the oxides and the catalysts are both supported on the carrier material such as conductive carbon materials.

For example, JP-A No. 2004-95263 (KOKAI) teaches that a mixture of metal oxide powders and carbon powders that support Pt, or carbon powders that support metal oxide fine particles and Pt fine particles is used as the catalysts of the cathode in which an ozone-containing gas is used as an oxidizing agent.

JP-A No. 9-167620 (KOKAI) aims to provide fuel cell electrode catalysts that suppresse the elution and sintering of a catalytically active metal at a high-temperature cathode atmosphere in which a phosphoric acid electrolyte and oxygen acting as an oxidizing agent are present together. To obtain both high catalytic activity and good durability, metal catalyst particles supported by carbon powders are covered with oxide or hydroxide, either containing Si and at least one element selected from the group consisting of Nb, Ni, Sn, Ta, Ti, and Zr.

The supported catalyst using carbon powders as the carrier material is certainly excellent in conductivity but is low in the catalytic activity. As a result, the fuel cell using the electrode catalyst disclosed in JP-A Nos. 2004-95263 (KOKAI) and 9-167620 (KOKAI) cannot exhibit excellent output performance.

JP-A No. 2004-73991 (KOKAI) aims to convert effectively hydrocarbon compounds into a mixed gas consisting of carbon monoxide and hydrogen, by employing steam reforming reaction using a catalyst supporting a small amount of a cheap metal. The catalyst comprises solid super acid carrier in which a sulfate group or tungsten oxide is supported by zirconium oxide or zirconium hydroxide and at least one metal selected from the Group VIII or Group IB elements of the Periodic Table, which is supported by the solid super acid carrier. Note that the sulfate group or the tungsten oxide is interposed between the oxide or hydroxide of zirconium and the metal. Thus, no interfaces are shared by the oxide or hydroxide of zirconium, the sulfate group or the tungsten oxide, and the metal.

JP-A No. 2003-80077 (KOKAI) discloses a technology of improving the stability of catalyst for removing air pollutants from the exhaust gas of vehicles. This publication teaches that the catalyst comprises base particles formed of single material selected from the group consisting of oxides of Ce, Zr, Al, Ti, Si, Mg, W, Sr and derivatives thereof or a solid solution formed of at least two materials selected from the group consisting of oxides of Ce, Zr, Al, Ti, Si, Mg, W, Sr and derivatives thereof. The publication further teaches that metal particles and a sintering preventing agent are supported by the base particle noted above. The sintering preventing agent is formed of a metal having a melting point not lower than 1,500° C. or an oxide of the metal. The sintering preventing agent prevents the metal particles from being sintered at a high temperature in the vicinity of about 1,000° C., suppressing the decrease in the specific surface area of the metal particles, and thus maintaining high reactivity. Hence, the sintering preventing agent is formed of a single material selected from the group consisting of oxides of Al, Mg, Ca, Ce, Sr, Zn, W and Mo and derivatives thereof, or a solid solution of at least two materials selected from the group consisting of oxides of Al, Mg, Ca, Ce, Sr, Zn, W and Mo and derivatives thereof. Note that the sintering preventing agent formed of the particular materials exhibits a melting point not lower than 1,500° C.

However, using any supported catalyst disclosed in JP-A Nos. 2004-73991 (KOKAI) and 2003-80077 (KOKAI) as the fuel electrode catalyst, both high catalytic activity and high conductivity cannot be attained. Consequently, excellent output performance cannot be achieved. No catalyst materials exhibiting a sufficiently high catalytic activity have not yet been found. This is why Pt—Ru or Pt are mainly used as anode catalyst material and cathode catalyst material. To improve further the output performance of the fuel cell, it is important to develop electrode catalysts having high catalytic activity, high conductivity and high stability.

BRIEF SUMMARY OF THE INVENTION

According to an aspect of the present invention, there is provided a supported catalyst comprising:
an oxide carrier;
catalyst particles supported on the oxide carrier;
catalyst layers supported on the oxide carrier, containing an oxide or a composite oxide which includes at least one element selected from the group consisting of Mo, W, Sn and Ru, and having a melting point lower than 1,500° C., each of the catalyst layers locating among the catalyst particles; and
interface portions among the oxide carrier, the catalyst particles and the catalyst layers.

According to another aspect of the present invention, there is provided a fuel cell comprising an anode, a cathode, and a proton conductive membrane provided between the anode and the cathode, wherein at least one of the anode and the cathode comprises:
an oxide carrier;
catalyst particles supported on the oxide carrier;
catalyst layers supported on the oxide carrier, containing an oxide or a composite oxide which includes at least one element selected from the group consisting of Mo, W, Sn and Ru, and having a melting point lower than 1,500° C., each of the catalyst layers locating among the catalyst particles; and
interface portions among the oxide carrier, the catalyst particles and the catalyst layers.

BRIEF DESCRIPTION OF THE SEVERAL VIEWS OF THE DRAWING

FIG. 3 is a high-magnification TEM photograph showing the supported catalyst for Example 1.

DETAILED DESCRIPTION OF THE INVENTION

Various embodiments will be described, with reference to the accompanying drawings.

Figure 1:
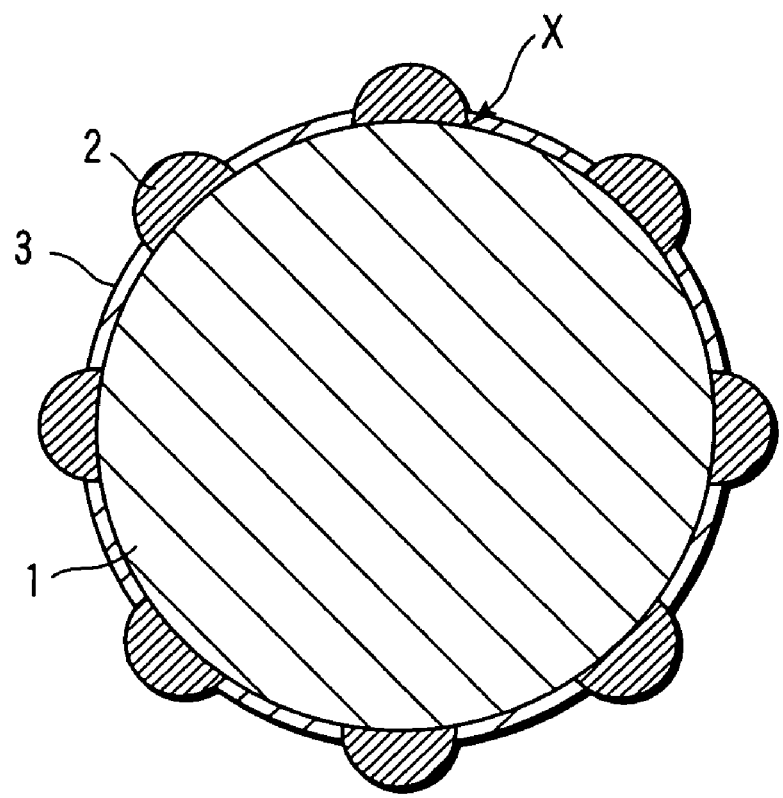
FIG. 1 is a sectional view schematically showing a supported catalyst according to one embodiment.

As shown in FIG. 1, the supported catalyst comprises an oxide carrier 1, catalyst particles 2 and a catalyst layers 3. The supported catalyst has been constructed as will be described below.

The catalyst particles 2 are supported on the surface of the oxide carrier 1. The catalyst layers 3 are supported on the surface of the oxide carrier 1, with each catalyst layer 3 positioned among the adjacent catalyst particles 2. As arrow X indicates in FIG. 1, an interface portion (hereinafter called to as common interface) positioned among the oxide carrier 1, catalyst particle 2 and catalyst layers 3 is, is included in the surface of the oxide carrier 1. This structure is called herein nano-hetero structure.

In this embodiment, the nano-hetero structure enables the catalyst particle and the catalyst layers to produce a synergetic effect. To obtain high catalytic activity, high conductivity and high stability, the selection of the catalyst layers is also important, in addition to the common interface shared by the catalyst particle, oxide carrier and catalyst layers. The catalyst layers contain an oxide or a composite oxide which includes at least one element selected from the group consisting of Mo, W, Sn and Ru. The catalyst layers have a melting point lower than 1,500° C. In this case, local charge distribution is achieved in a region including the common interface, through the common interface provided in the nano-hetero structure. It is reasonably understood that a synergetic effect between the catalyst particle and the catalyst layers results from the quantum effect or the mutual diffusion in the vicinity of the common interface among the catalyst particle, catalyst layers and oxide carrier. The synergetic effect improves the catalytic activity and the conductivity of the supported catalyst. Since the catalyst layers have excellent durability, the stability of the supported catalyst can be enhanced. It is therefore possible to improve the output performance of the fuel cell.

The catalytic reaction in the fuel cell takes place, mainly on the catalyst particles. In view of this, the catalyst particles can be called main catalyst particles. On the other hand, the catalyst layers enhance the activity of the main catalyst particles and, thus, can be called promoter layers.

The main catalyst particles, the promoter layers and the oxide carrier will now be described in detail.

<Main Catalyst Particle>

The d-electron structure of transition metals is particularly excellent in catalytic activity. Therefore, the main catalyst particle should better contain transition metal. Of transition metals, noble metal or specially treated base metal should be used to achieve both high chemical stability and high electrochemical stability.

Pt, Au and Pd are particularly excellent in catalytic activity and chemical stability. Therefore, it is desirable for the main catalyst particles to contain at least 40 atomic % of at least one noble metal selected from the group consisting of Pt, Au and Pd. It is possible for the main catalyst particles of Pt, Au and Pd to be substituted partly by at least one substituting element selected from the group consisting of Ru, Ir, Rh and Ag so as to provide the main catalyst particles.

Ru, Ir, Rh and Ag exhibit excellent promoter activity in oxidizing CO generated as a by-product in the oxidizing reaction of the organic fuel, thereby producing $CO_2$. It follows that the catalytic activity of the supported catalyst can be further improved by using the substituting element noted above.

The transition metal subjected to a special treatment includes, for example, a nitride of a transition metal or a material having a transition metal center structure having covalent bond. The nitrides of the transition metal include, for example, PtFeN, and PtCoN. Also, the material having transition metal center structure having covalent bond can be obtained by subjecting a transition metal complex to heat treatment. The transition metal complex noted above includes, for example, a salen complex and a porphyrin complex of cobalt, nickel, etc.

It is desired that the main catalyst particles be formed of fine particles of nano-size. To achieve high activity, it is desirable for the main catalyst particles to have an average particle diameter not larger than 3 nm, most desirably not larger than 2 nm. The smaller the diameter of the main catalyst particles, the higher the ratio of the common interface of the supported catalyst, and more vigorous the interaction among the main catalyst particles, promoter layers and oxide carrier. This improves the catalytic activity of the catalyst. If the diameter of the main catalyst particle is too small, however, the stability of the supported catalyst will decrease in some cases. It is therefore desirable for the main catalyst particles to have an average particle diameter not smaller than 0.5 nm.

<Promoter Layer>

The promoter layers are required to exhibit good conductivity and high stability. Therefore, the promoter layers are formed of an oxide or a composite oxide which includes at least one element selected from the group consisting of Mo, W, Sn and Ru. The promoter layers have a melting point lower than 1,500° C. The inclusion of the promoter layers and the nano-hetero structure makes it possible to improve markedly the catalytic activity of the supported catalyst, compared with the case where promoter particles are added separately to the catalyst or the case where the supported catalyst, which certainly includes promoter layers, does not have the nano-hetero structure. The inclusion of the promoter layers and the nano-hetero structure also makes it possible to improve markedly the conductivity of the supported catalyst, compared with case where the oxide constituting the supported catalyst is used seperately. For further improving the conductivity, it is desirable for the supported catalyst to exhibit resistivity not higher than 5,000 mΩcm in the vicinity of room temperature.

The melting point of the promoter layers is defined to fall within the range described above. If the melting point of the promoter layers is not lower than 1,500° C., the common interface is made insufficient, with the result that it is difficult to obtain the hetero structure and, thus, high output performance cannot be obtained. However, if the melting point of the promoter layers is excessively low, it is difficult to form the promoter layers. In addition, the stability of the fuel cell performance over a long period tends to be lowered. Such being the situation, it is desirable for the promoter layers to have a melting point not lower than 500° C. It is more desirable for the promoter layers to have a melting point falling within a range of 600 to 1,400° C.

It is desired that the promoter layers should have an average thickness not larger than 3 nm. If the average thickness exceeds 3 nm, the interaction among the promoter layers, oxide carrier and main catalyst particle will diminish, inevitably lowering the catalytic activity of the supported catalyst. If the average thickness of the promoter layers exceeds 3 nm, the fuel cell will have low stability over a long period in some cases. Preferably, the promoter layers may have an average thickness not larger than 2 nm. If the promoter layers is excessively thin, the function of the promoter will diminish. In addition, the thickness of the promoter layers will be non-uniform. It is therefore desirable for the promoter layers to have an average thickness not smaller than 0.2 nm. The surface of the oxide carrier need not be covered completely with the promoter layers. The catalytic activity should be improved if the carrier is exposed outside. The promoter layers can be of single-layered structure or multi-layered structure. Other oxides may be added to the surface of the oxide carrier in addition to the main catalyst particles and the promoter layers.

<Oxide Carrier>

Various oxides or composite oxides can be used as oxide carrier. To achieve high output performance, it is effective to use binary oxide such as $MoO_2$, $RuO_2$ or $WO_2$ for forming the promoter layers. $MoO_2$ oxide, in particular, exhibits electron conductivity. The conductivity can therefore be improved by the synergetic effect resulting from the combination of the $MoO_2$ oxide and the oxide carrier. The combination of the oxide carrier and the promoter layers is very important because it further improves the catalytic activity and the conductivity of the supported catalyst having the nano-hetero structure. Although the mechanism has not yet been clarified in detail, the lattice matching between the oxide carrier and the promoter layers, the lattice matching between these two oxides and the main catalyst particles, the interfacial structure, the charge transfer, and their stability and durability appear, in combination, to influence the catalytic activity and the conductivity of the supported catalyst. Preferred combinations (1) and (2) of the oxide carrier and the promoter layers will be described.

(1) If the promoter layers include an oxide or a composite oxide which includes Mo, it is desirable to form the oxide carrier of an oxide or a composite oxide which includes at least one element selected from the group consisting of Ti, Zr, Sn, W, Al, Cr, Nb and Si. The oxide or composite oxide included in the promoter layers and containing Mo is, for example, $MoO_x$, where x is the molar ratio that falls within a range of 1 to 3. Particularly, it is desirable for the $MoO_x$ to consist of $MoO_2$. The molar ratio x of $MoO_x$ can be changed at the power generating reaction stage of the fuel cell. The molar ratio x of $MoO_x$ can be changed under the influences given by the composition of the main catalyst particles or the oxide carrier. However, if the molar ratio x of $MoO_x$ falls within a range of 1 to 3, supported catalysts can be obtained, which have promoter layers having a melting point lower than 1,500° C. and excellent in the output performance. The oxides forming the oxide carrier include, for example, $TiO_2$, $ZrO_2$, $SnO_2$, $WO_3$, $Al_2O_3$, $Cr_2O_3$, $Nb_2O_5$ and $SiO_2$. On the other hand, the composite oxides forming the oxide carrier can be made of the oxides described above.

(2) If the promoter layers include an oxide or a composite oxide which includes at least one element selected from the group consisting of W, Sn and Ru, the oxide carrier should be made of oxide containing Mo or a composite oxide containing Mo. The oxide forming the promoter layers and containing at least one element selected from the group consisting of W, Sn and Ru is, for example, $RuO_x$, $WO_x$ or $SnO_x$. It is desired that the molar ratio x of each of these oxides should fall within a range of 1 to 3, for the reason similar to that described above for $MoO_x$. Of the oxides specified above, $RuO_2$, $WO_2$ and $SnO_2$ are preferred as oxide forming the promoter layers. The composite oxide included in the promoter layers can be made of the oxides noted above. The oxide forming the oxide carrier and containing Mo is, for example, $MoO_3$.

Particularly, the combination (1) given above produces a prominent effect. A supported catalyst that improves the output performance very much can be obtained by using zeolite ($SiO_2$—$Al_2O_3$ series oxide) or a composite oxide having a perovskite structure as the oxide of the oxide carrier. High output performance can be attained by using, for example, a perovskite composite oxide containing La, Sr, Mn and Co.

The oxide carrier should exhibit resistivity not higher than 5,000 mΩcm at a temperature in the vicinity of room temperature. If the oxide carrier has such resistivity, in this case, the supported catalyst will have particularly high conductivity.

It is desirable for the oxide carrier to have an average particle diameter falling within a range of 10 to 100 nm. If the average diameter of the oxide carrier exceeds 100 nm, the size of the resultant supported catalyst will increase. As a result, the loading rate of the supported catalyst in the electrode may decrease, inevitably lowering the output performance of the fuel cell. If the average particle diameter of the oxide carrier is smaller than 10 nm, the fuel or oxidizing agent will have lower permeability with respect to the electrode.

The main catalyst particle, the promoter layers, and the oxide carrier may be amorphous, quasi-crystal or crystal. Alternatively, they may be a mixture of amorphous material, quasi-crystal material and crystalline material. A supported catalyst having a higher activity can be obtained by using amorphous material as oxide carrier. Concerning the composition of the oxide, the activity or conductivity of the supported catalyst can increase if there are oxygen defect sites or metal defect sites. To have the activity, conductivity or stability improved, the supported catalyst may be subjected special treatment such as nitriding or to baking performed after the catalyst is impregnated with complex. Excellent catalytic activity can also be obtained by mixing, the supported catalyst with common catalysts and common supported catalysts, as well as carbon materials such as carbon black, carbon nano-fiber or carbon nano-tube.

The nano-hetero structure and the particle diameter of the main catalyst particle as well as the average thickness of the promoter layers can be analyzed by transmission electron microscope (TEM). The crystal structure of the oxide carrier, the promoter layers and the main catalyst particles can be analyzed by X-ray diffraction analysis (XRD). Further, the valency of the element at the surface region of the supported catalysts can be measured by X-ray photoelectron spectroscopic method (XPS).

A method of manufacturing the supported catalyst according to the embodiment of the present invention will now be described. The method is limited to a particular one. For example, it may be a solution method for manufacturing the supported catalyst, a physical vapor deposition method, or a sputtering method for manufacturing the supported catalyst. If an oxide is formed, covering the surface of a metal fine particle, the activity of the metal fine particle can be lowered. In the solution method, the promoter layers can be selectively supported on the oxide carrier easily by controlling the supporting conditions. Hence, the solution method was studied mainly.

The solution method for allowing the particles of the main catalyst metal and the promoter layers to be supported on the oxide carrier can be classified into two kinds, i.e., simultaneous supporting method and successive supporting method. In the simultaneous supporting method, the precursor materials of the main catalyst metal and the promoter oxide are supported together on the oxide carrier, followed by applying an after-treatment such as a reducing treatment so as to manufacture the supported catalysts having the hetero structure. On the other hand, in the successive supporting method, the main catalyst metal is supported first on the oxide carrier, followed by allowing the promoter oxide to be supported on the oxide carrier. To manufacture the supported catalyst, the successive supporting method is particularly desirable. The successive supporting method comprises a supporting step for manufacturing a catalyst precursor (supported catalyst A) by allowing the main catalyst particles to be supported by the oxide carrier and an impregnating step for imparting another oxide to the catalyst precursor by the impregnating method.

The supporting step will be described first.

The main catalyst particles can be manufactured by, for example, a solid phase reaction method, a solid phase-gaseous phase reaction method, a liquid phase method (solution method), or a gaseous phase method. The liquid phase method (solution method) includes an impregnating method, a precipitation method, a colloidal method and an ion exchange method. In the Examples described herein later, the main catalyst particles are manufactured by the precipitation method. It is desired that the reducing treatment included in the precipitation method be carried out at 100 to 600° C. for 1 to 10 hours, while supplying a reducing gas to the reaction system at a flow rate of 100 to 2,000 mL/min. The conditions for the reducing treatment are not limited to those exemplified above.

The impregnating step will be described in detail.

The impregnating step comprises dipping the catalyst precursor in a solution of a metal salt containing at least one promoter metal selected from the group consisting of Mo, W, Sn and Ru, drying the catalyst precursor, and applying heat treatment to the catalyst precursor at a temperature falling within a range of 500 to 1,000° C.

In the solution method described above, it is important to set appropriately the conditions for converting the precursor of the promoter layers into a thin oxide layers. The present inventors have found that the conversion of the precursor of the promoter layers into the oxide layers depends, to some extent, on the melting point of the oxide layers, though the conversion process from the precursor into the oxide layers has not yet been grasped sufficiently. To be more specific, it is desirable for the oxide or the composite oxide forming the promoter layers to have a melting point lower than 1,500° C. The present inventors have also found that, in an oxide having a melting point not lower than 1,500° C., it is difficult to form layers and, at the same time, to suppress the growth of the metal particles, though it is possible to change the melting point of the oxide, depending on the state of the oxide, the treating atmosphere and the size of the oxide particles.

The solution of a metal salt containing the promoter metal can be an aqueous solution containing a plurality of kinds of metal salts which are raw materials for the composite oxide. The reducing operation included in the supporting step can be omitted in some cases.

If the temperature in the heat treating process exceeds 1,000° C., the main catalyst particles will readily grow, making it difficult to form the common interface. Also, if the promoter used is an oxide having a high melting point not lower than 1,500° C., the promoter oxide tends to become granular, rendering it difficult to form the common interface even if the heat treatment is carried out under temperatures not higher than 1,000° C. On the other hand, if the heat treatment is performed at temperatures lower than 500° C., the promoter precursor will hardly be converted into thin oxide layers even if an oxide or a composite oxide, either having a melting point lower than 1,500° C. is used. It is desired that the heat treatment be carried out at a temperature falling within the range given above, for 1 to 10 hours, while supplying an inert gas to the reaction system at a low rate of 100 to 2,000 mL/min. To form a plurality of promoter layers of various kinds, it suffices to repeat the impregnating step described above.

The fuel cell according to an embodiment of the present invention comprises an anode, a cathode, and a proton conductive membrane arranged between the anode and the cathode. The fuel cell will now be described, with reference to the accompanying drawing.

Figure 2:
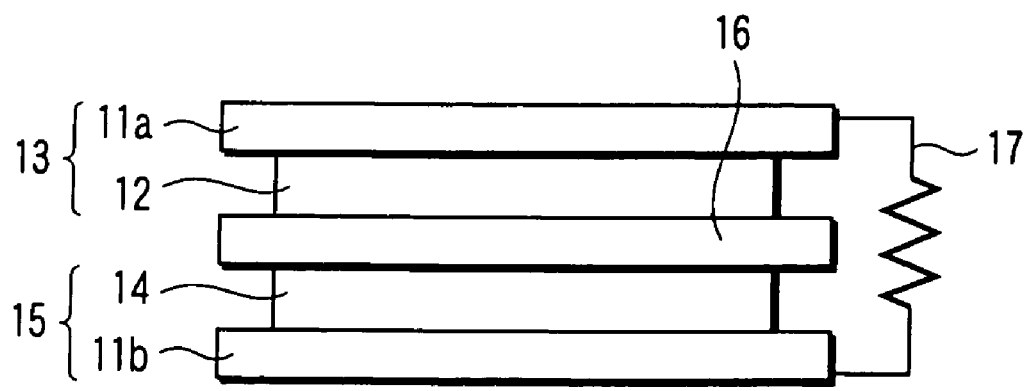
FIG. 2 is a side view schematically showing a MEA of the fuel cell according to the embodiment.

The MEA shown in FIG. 2 constitutes the electromotive section of the fuel cell and comprises an anode 13, a cathode 15, and a proton conductive membrane 16. The anode 13 includes a porous conductive sheet 11a and an anode catalyst layer 12 laminated on the porous conductive sheet 11a. Likewise, the cathode 15 includes a porous conductive sheet 11b and a cathode catalyst layer 14 laminated on the porous conductive sheet 11b. The anode 13 and the cathode 15 are laminated one upon the other with the proton conductive membrane 16 interposed between them. In FIG. 2, reference numeral 17 denotes an external circuit.

The catalyst material contained in the catalyst layers can be the supported catalyst for the fuel cell according to the embodiment of the present invention, in each of the anode and the cathode. Alternatively, the electrode using the supported catalyst according to the embodiment of the present invention and another electrode, e.g., an electrode using a catalyst metal such as platinum or ruthenium or an alloy thereof, can be used in combination.

It is possible to use a sheet formed of a gas permeable material or a liquid permeable material such as a carbon cloth or a carbon paper as the porous conductive sheet (diffusion layer).

The proton conductive material contained in the anode catalyst layer, the cathode catalyst layer and the proton conductive membrane is not particularly limited. An optional proton conductive material can be used instead, as far as it permits transmitting the proton. The proton conductive material includes, for example, the fluorocarbon resin having sulfonic acid group such as Nafion (manufactured by Dupont Inc.), Flemion (manufactured by Asahi Kasei K.K.), and Aciprex (manufactured by Asahi Glass K.K.) and inorganic materials such as tungstic acid and phosphorus tungstate, though the proton conductive material is not limited to the materials exemplified above.

The anode and the cathode can be manufactured as follows. First, an electrode composition is prepared, which contains the catalyst material described above, the proton conductive material, water and an organic solvent. Preferably, this electrode composition is prepared by dissolving the proton conductive substance in the organic solvent and dispersing the catalyst material and the conductive agent in water, followed by mixing the resultant solution and the resultant dispersion.

The proton conductive material is dissolved in the organic solvent, because the proton conductive material is generally low in its solubility in water and high in its solubility in the organic solvent. An electrode having the proton conductive material, the catalyst material and the conductive agent uniformly dispersed therein can be manufactured by mixing the solution noted above with the dispersion having the catalyst material and the conductive agent dispersed in water. The organic solvent can be of any type, as far as it can dissolve the proton conductive material. For example, ethanol or 1-propanol can be used as organic solvent. Further, the organic solvent can be a mixture consisting of these organic solvents and water. To disperse the catalyst material and the conductive agent in water, it is advisable to use a known dispersing device such as a homogenizer or a ball mill.

The cathode catalyst layer can be formed by removing water and the organic solvent from the resultant electrode composition by means of, for example, evaporation. Further, the electrode can be manufactured by stacking the cathode catalyst layer thus manufactured on a porous conductive sheet.

The method of manufacturing the electrode is not limited to the above-described one. In other words, a different method can be employed.

For example, the electrode can be manufactured by filtering the suspension having the catalyst material and the conductive agent dispersed in water through a porous conductive sheet used as a supporting body, drying the filtrate on the supporting body, allowing an organic solvent dissolving the proton conductive material to permeate into the supporting body, and evaporating the organic solvent.

Alternatively, the electrode can be manfuctured by mixing uniformly a suspension having the catalyst material and the conductive agent dispersed in water with an organic solvent dissolving the proton conductive material, and by coating a porous conductive sheet with the mixture and subsequently drying the coated mixture.

The MEA can be manufactured, for example, as follows.

Specifically, the MEA can be manufactured by hot pressing the anode, the proton conductive membrane and the cathode ...

the temperature of the hot press can be set at, for example, 100 to 180° C. and the pressure can be set at 10 to 200 kg/cm². It suffices to carry out the hot pressing for about 1 to 30 minutes under the conditions given above.

The fuel cell according to an embodiment of the present invention comprises the MEA described above and sections for supplying a fuel and an oxidizing agent to the MEA. According to the electromotive force required, the fuel cell can include a single MEA or a plurality of MEA's. Other fuel, such as ethanol, formic acid can also be used.

Examples of the present invention will now be described. Needless to say, the embodiment of the present invention is not limited to the following Examples.

<Preparation of Supported Catalyst>

EXAMPLE 1

First, 20 g of titanium oxide fine particles having an average diameter of 50 nm, which were used as oxide carrier, were put in 3,000 mL of pure water and mixed uniformly by using a homogenizer. A uniform suspension was thereby prepared. The suspension was put in a flask and stirred at reflux for one hour. Then, a mixed aqueous solution was prepared as an aqueous solution of a metal salt X containing the main catalyst metal in an amount of 42 mg/mL. by mixing an aqueous solution of $H_2PtCl_6$ and another aqueous solution of $H_2RuCl_5$. These two aqueous solutions were mixed, such that the ratio of the metal contained in these two aqueous solutions was equal to the ratio of the metal contained in the main catalyst alloy. Then, 120 mL of the mixed aqueous solution was added to the suspension. An aqueous solution of sodium bicarbonate (50 mg of salt/mL of water) was gradually dripped into the resultant system 20 minutes later, at a rate of 10 mL/min, until the pH value of aqueous system was changed to 9. After the dripping, the aqueous solution was left at reflux for one hour, filtering the aqueous solution. The precipitate was transferred into a flask and held at reflux for 30 minutes with a dilute sulfuric acid. The precipitate was filtered again. The precipitate was then transferred into a flask and sufficiently washed with pure water. The precipitate thus washed was held at reflux for 30 minutes with pure water, followed by filtering the precipitate and subsequently drying the filtered precipitate at 100° C. The precipitate dried was put in a high purity zirconia boat and reduced at 250° C. for 2 hours within a cylindrical furnace while supplying a 3% $H_2/N_2$ gas into the furnace at a flow rate of 100 mL/min. Then, the temperature within the furnace was changed back to room temperature. A catalyst precursor (supported catalyst A) having the main catalyst particles supported on the surface of the oxide carrier was thereby obtained.

Next, 20 g of the catalyst precursor (supported catalyst A) was put in 200 mL of an aqueous solution of a metal salt Y that contained the promoter metal shown in Table 1 in an amount of 2 mg/mL. The water was evaporated, while the aqueous solution was being stirred. The residue was dried at 100° C. Then, the catalyst precursor was put in a high purity zirconia boat and subjected to a heat treatment at 700° C. for 5 hours within a cylindrical furnace, while Ar gas was being supplied into the furnace at a flow rate of 1,000 mL/min. As a result, a supported catalyst was obtained.

The supported catalyst thus obtained was examined under transmission type electron microscope (TEM). FIG. 3 is a high-magnification TEM photograph of the supported catalyst.

As apparent from FIG. 3, the main catalyst particles 2 and the promoter layers 3 were supported on the surface of the oxide carrier particle 1, and the promoter layers 3 was found locate among the adjacent main catalyst particles 2. The promoter layers 3, the main catalyst particle 2, and the oxide carrier 1 had common interface, which is denoted by an arrow X in FIG. 3. This indicates the supported catalyst thus obtained had a nano-hetero structure indeed. The TEM-EDS confirmed that each of the main catalyst particle and the promoter layers had a composition shown in Table 1. To determine the average particle diameter of the main catalyst particles, samples consisting of dispersions of the supported catalysts thus obtained were observed with TEM. Ten main catalyst particles whose entire contour was observed were selected at random in five different view fields, and the diameter of the main catalyst particles thus selected was meaured. The average diameter of 50 main catalyst particles was set as the average diameter of the main catalyst particles. The main catalyst particles were found to have a diameter distribution of 2 to 5 nm and to have an average diameter of 3.0 nm. Note that the average diameter of the oxide carriers was measured in the same way as the average particle diameter of the main catalyst particles.

To determine the average thickness of the promoter layers, samples consisting of dispersions of the supported catalyst thus obtained were observed with TEM. Ten supported catalysts were selected at random in five different view fields to measure the thickness of the promoter layer of each of the supported catalysts. The average value of the thickness in the 50 supported catalysts was used as average thickness of the promoter layers. The promoter layers were found to have a thickness distribution of 1 to 3 nm and to have an average thickness of 1.5 nm.

The supported catalysts thus obtained were subjected to X-ray diffraction analysis (XRD). A characteristic peak of $MoO_2$ was observed. A differential thermal analysis (DTA) was conducted on the catalyst precursor before the impregnating step and on the supported catalyst after the impregnating step. A heat absorption peak derived from the impregnating step was observed at temperatures not higher than 1,000° C. This proves that the melting point of the oxide layers (promoter layers) containing Mo was lower than 1,500° C.

EXAMPLES 2 TO 8

A supported catalyst was manufactured as in Example 1, except that the kinds of the oxide carriers were changed as shown in Table 1.

EXAMPLES 9 AND 10

A supported catalyst was manufactured as in Example 1, except that the kinds of the oxide carriers and the metal salts Y were changed as shown in Table 1.

TEM observation revealed that these supported catalysts had the nano-hetero structure. On the surface of the oxide carrier, oxide particles were also found together with the main catalyst particles and the promoter layers. The TEM-EDS showed that the supported catalysts for Examples 9 and 10 did have a composition of the promoter layers, as shown in Table 1. The DTA found a heat absorption peak derived from the impregnating step, at a temperuare not lower than 1,200° C. and less than 1,500° C., in the supported catalyst for each of Examples 9 and 10. This indicates that the oxide layers in these Examples had a melting point lower than 1,500° C.

$MoO_3$ was used as the oxide carrier. However, the XRD analysis of the supported catalyst, perforemed after the impregnating step, found a characteristic peak of $MoO_2$ in the supported catalyst for Examples 9 and 10.

The surface acidity was determined for the supported catalyst obtained in Example 9, by using an indicator color change reaction method. The surface of the supported catalyst exhibited solid super acidity.

EXAMPLE 11

A supported catalyst was manufactured as in Example 1, except that the amount of the promoter metal contained in the aqueous solution of the metal salt Y was changed to 8 mg/mL.

TEM observation showed that the supported catalyst thus obtained had a nano-hetero structure. However, the main catalyst particles were partly covered with the promoter layers. The promoter layers had a thickness of 2 to 5 nm and an average thickness of 3.0 nm.

EXAMPLES 12 TO 14

A supported catalyst was manufactured as in Example 1, except that the kinds of the oxide carriers were changed into the composite oxides shown in Table 1.

EXAMPLE 15

A supported catalyst was manufactured as in Example 1, except that the aqueous solution of the metal salt Y was a mixed aqueous solution prepared by mixing two aqueous solutions containing two kinds of metal salts shown in Table 1 such that the ratio of the metals contained in the aqueous solutions was made equal to the desired ratio of the metals contained in the promoter composite oxide.

TEM observation revealed that the supported catalyst had a nano-hetero structure. On the surface of the oxide carrier, oxide particles were found, as well as the main catalyst particles and the promoter layers.

The promoter layers was found to have been formed of a composite oxide having the composition shown in Table 1. The DTA found a heat absorption peak derived from the impregnating step, at a temperature falling within a range of 1,000 to 1,200° C. This proves that the oxide layers (promoter layers) had a melting point lower than 1,500° C.

EXAMPLES 16 AND 17

A supported catalyst was manufactured as in Example 1, except that the aqueous solution of the metal salt X was a mixed aqueous solution prepared by mixing two aqueous solutions containing two kinds of metal salts shown in Table 2 such that the ratio of the metals contained in the aqueous solutions was made equal to the desired ratio of the metals contained in the main catalyst alloy.

The results of TEM-EDS showed that the composition of the main catalyst particles for Examples 16 and 17 was PtSn (Pt; 50 atomic %, Sn; 50 atomic %) and PtPd (Pt; 50 atomic %, Pd; 50 atomic %)

EXAMPLES 18 AND 20

A supported catalyst was manufactured as in Example 1, except that aqueous solutions of the metal salts shown in Table 3 were used as aqueous solutions of the metal salt X.

The results of TEM-EDS revealed that the main catalyst particles of the supported catalyst for Example 18 were made of Pt particles, and that the main catalyst particles of the supported catalyst for Example 20 were formed of Au particles.

EXAMPLE 19

A supported catalyst was manufactured as in Example 18, except that the kind of the metal salt Y was changed as shown in Table 3.

The results of TEM-EDS showed that the main catalyst particles and the promoter layers had compositions as shown in Table 3. The results of the DTA revealed that the heat absorption peak derived from the impregnating step appeared at a temperature falling within a range of 800 to 1,200° C. This proves that the melting point of the oxide layers was lower than 1,500° C.

COMPARATIVE EXAMPLE 1

A supported catalyst was manufactured as in Example 1, except that the kind of the metal salt Y was changed as shown in Table 1.

TEM observation and TEM-EDS analysis showed that, the supported catalyst thus obtained had been constructed such that the main catalyst particles and granular $Al_2O_3$ particles had been supported on the surface of the oxide carrier formed of $TiO_2$, and that promoter layers had not been supported on the surface of the oxide carrier. The results of DTA showed that the heat absorption peak derived from the impregnating step appeared at a temperature not lower than 1,500° C. This indicates that the melting point of the granular oxide particles was not lower than 1,500° C.

COMPARATIVE EXAMPLE 2

The catalyst precursor (supported catalyst A) for Example 1 was used as supported catalyst for Comparative Example 2.

TEM observation revealed that the main catalyst particles had indeed been supported on the surface of the oxide carrier. However, a promoter layers had not been supported on the surface of the oxide carrier.

COMPARATIVE EXAMPLE 3

The catalyst precursor (supported catalyst A) for Example 9 was used as supported catalyst for Comparative Example 3.

TEM observation showed that the main catalyst particles had indeed been supported on the surface of the oxide carrier. However, a promoter layers had not been supported on the surface of the oxide carrier.

COMPARATIVE EXAMPLE 4

A supported catalyst was manufactured as in Example 1, except that the titanium oxide fine particles (oxide carrier) were subjected to the supporting step after the impregnating step.

TEM observation showed that the supported catalyst thus manufactured had been constructed such that the surface of the oxide carrier was covered with a film of Mo oxide and that the main catalyst particles had been supported on the Mo oxide film.

COMPARATIVE EXAMPLE 5

A supported catalyst was manufactured as in Comparative Example 4, except that the oxide carrier and the metal salt Y were changed as shown in Table 1.

TEM observation and the results of TEM-EDS revealed that the supported catalyst thus manufactured had been constructed such that the surface of the oxide carrier was covered with a film of W oxide and that the main catalyst particles had been supported on the surface of the W oxide film. In the XRD, a characteristic peak of $WO_2$ was observed.

The surface acidity of the supported catalyst thus manufactured was measured by an indicator color change reaction method. The surface acidity was found to be solid super acidity.

COMPARATIVE EXAMPLE 6

A catalyst precursor (supported catalyst A) was prepared as in Example 1, except that 8 g of vulcan carbon black was used in place of 20 g of the titanium oxide fine particles. The catalyst precursor (supported catalyst A) thus obtained was used as a supported catalyst for Comparative Example 6.

TEM observation showed that the main catalyst particles had been supported on the surface of the oxide carrier. However, a promoter layers had not been supported on the surface of the oxide carrier.

COMPARATIVE EXAMPLE 7

A supported catalyst was manufactured as in Example 1, except that 10 g of the catalyst precursor (supported catalyst A) for Comparative Example 6 was used in place of 20 g of the catalyst precursor (supported catalyst A) for Example 1.

TEM observation and the results of TEM-EDS showed that the supported catalyst thus manufactured had been constructed such that the main catalyst particles and granular Mo oxide particles were supported on the vulcan carbon black and that promoter layers had not been supported on the vulcan carbon black. A characteristic peak of $MoO_2$ was observed in the XRD analysis.

COMPARATIVE EXAMPLES 8 AND 9

A supported catalyst was manufactured as in Comparative Example 6, except that used as the aqueous solution of the metal salt X was a mixed aqueous solution prepared by mixing two kinds of aqueous solutions of the metal salts shown in Table 2, which were mixed such that the ratio of the metal contained in the aqueous solutions was made equal to the desired ratio of the metal contained in the main catalyst alloy.

TEM observation revealed that the main catalyst particles had been supported on the oxide carrier indeed. However, a promoter layers had not been supported on the oxide carrier.

COMPARATIVE EXAMPLE 10

A supported catalyst was manufactured as in Comparative Example 5, except that an aqueous solution of the metal salt shown in Table 3 was used as the aqueous solution of the metal salt X.

TEM observation and the results of TEM-EDS showed that the supported catalyst thus manufactured had been constructed such that the surface of the oxide carrier was covered with a film of a W oxide and an that the main catalyst particles had been supported on the surface of the W oxide film. In the XRD, a characteristic peak of $WO_2$ was observed.

The surface acidity of the supported catalyst, which was measured by using an indicator color change reaction method, was found to be solid super acidity.

COMPARATIVE EXAMPLES 11 AND 12

A supported catalyst was manufactured as in Comparative Example 6, except that an aqueous solution of the metal salt shown in Table 3 was used as the aqueous solution of the metal salt X.

TEM observation showed that the main catalyst particles had been supported on the surface of the oxide carrier. However, a promoter layers had not been supported on the surface of the oxide carrier.

EXAMPLES 1 TO 15 AND COMPARATIVE EXAMPLES 1 TO 7

<Preparation of Anode>

First, 3 g of the supported catalyst for Example 1, 8 g of pure water, 15 g of a 20% Nafion solution, and 30 g of 2-ethoxy ethanol were sufficiently stirred and, then, dispersed by using a desk-top ball mill so as to prepare a slurry composition. A carbon paper (350 μm, manufactured by Toray Inc.), which had been subjected to a water-repelling treatment, was coated with the slurry composition by a control coater. The slurry composition coated was dried, forming an anode. The anode was loaded with the supported catalyst at a loading density of 3 mg/cm$^2$.

Likewise, anodes for Examples 2 to 15 and Comparative Examples 1 to 7 were manufactured as in Example 1, except that the supported catalysts for Examples 2 to 15 and Comparative Examples 1 to 7 were used in place of the supported catalyst for Example 1.

<Preparation of Cathode>

First, 2 g of the supported catalyst for Comparative Example 11, 5 g of pure water, 5 g of a 20% Nafion solution, and 20 g of 2-ethoxy ethanol were sufficiently stirred and then dispersed by using a desk-top ball mill, thus preparing a slurry composition. A carbon paper (350 μm, manufactured by Toray Inc.), which had been subjected to a water-repelling treatment, was coated with the slurry composition by a control coater. The slurry composition coated was dried, forming a cathode. The cathode was loaded with the supported catalyst at a loading density of 2 mg/cm$^2$.

<Preparation of MEA>

The anode manufactured in each of Examples 1 to 15 and Comparative Examples 1 to 7 was cut into a square piece of anode sized at 3.2 cm×3.2 cm, the electrode area being 10 cm$^2$. Also, the cathode was cut into square piece of cathode sized at 3.2 cm×3.2 cm, the electrode area being 10 cm$^2$. A Nafion 117 membrane (registered trademark, manufactured by Dupont Inc.)

used as a proton conductive polymer membrane was interposed between the cathode and the anode, forming a laminate structure. The laminate structure was subjected to hot pressing at 125° C. for 10 minute under the pressure of 30 kg/cm$^2$, thus manufacturing an MEA constructed as shown in FIG. 2.

<Manufacture and Evaluation of Fuel Cell>

A polymer-electrolyte type, single fuel cell of the direct fuel supply type was assembled by using the MEA manufactured as above, a fuel supply section, and a load circuit.

The fuel cell manufactured in each of Examples 1 to 15 and Comparative Examples 1 to 7 was discharged at a current density of 100 mA/cm$^2$, with the cell maintained at 50° C., by supplying a methanol aqueous solution (concentration of 1M) as fuel to the anode at a flow rate of 0.6 mL/min and supplying air to the cathode at a low flow rate of 160 mL/min. Table 1 shows the highest value of the cell resistance and the cell voltage measured 50 hours later.

TABLE 1

| | Metal salt Y | Carrier | Main catalyst particle | Promoter layer | Cell resistance (mΩ) | Cell voltage (V) |
|---|---|---|---|---|---|---|
| Example 1 | (NH$_3$)$_6$Mo$_7$O$_{24}$ | TiO$_2$ | PtRu | MoO$_{2.3}$ | 20 | 0.42 |
| Example 2 | (NH$_3$)$_6$Mo$_7$O$_{24}$ | ZrO$_2$ | PtRu | MoO$_{2.4}$ | 20 | 0.41 |
| Example 3 | (NH$_3$)$_6$Mo$_7$O$_{24}$ | SnO$_2$ | PtRu | MoO$_{2.4}$ | 20 | 0.42 |
| Example 4 | (NH$_3$)$_6$Mo$_7$O$_{24}$ | SiO$_2$ | PtRu | MoO$_{2.5}$ | 20 | 0.38 |
| Example 5 | (NH$_3$)$_6$Mo$_7$O$_{24}$ | WO$_3$ | PtRu | MoO$_{2.3}$ | 20 | 0.40 |
| Example 6 | (NH$_3$)$_6$Mo$_7$O$_{24}$ | Al$_2$O$_3$ | PtRu | MoO$_{2.3}$ | 20 | 0.38 |
| Example 7 | (NH$_3$)$_6$Mo$_7$O$_{24}$ | Cr$_2$O$_3$ | PtRu | MoO$_{2.4}$ | 20 | 0.39 |
| Example 8 | (NH$_3$)$_6$Mo$_7$O$_{24}$ | Nb$_2$O$_5$ | PtRu | MoO$_{2.4}$ | 20 | 0.38 |
| Example 9 | Na$_2$WO$_4$ | MoO$_3$ | PtRu | WO$_{2.1}$ | 24 | 0.40 |
| Example 10 | H$_2$SnCl$_4$ | MoO$_3$ | PtRu | SnO$_{1.9}$ | 25 | 0.40 |
| Example 11 | (NH$_3$)$_6$Mo$_7$O$_{24}$ | TiO$_2$ | PtRu | MoO$_{2.2}$ | 27 | 0.37 |
| Example 12 | (NH$_3$)$_6$Mo$_7$O$_{24}$ | 5SiO$_2$—Al$_2$O$_3$ | PtRu | MoO$_{2.3}$ | 24 | 0.38 |
| Example 13 | (NH$_3$)$_6$Mo$_7$O$_{24}$ | La$_{0.8}$Sr$_{0.2}$MnO$_3$ | PtRu | MoO$_{2.3}$ | 23 | 0.38 |
| Example 14 | (NH$_3$)$_6$Mo$_7$O$_{24}$ | La$_{0.8}$Sr$_{0.2}$CoO$_3$ | PtRu | MoO$_{2.4}$ | 23 | 0.39 |
| Example 15 | (NH$_3$)$_6$Mo$_7$O$_{24}$Na$_2$WO$_4$ | TiO$_2$ | PtRu | MoWO$_{2.1}$ | 22 | 0.42 |
| Comparative Example 1 | Al(NO$_3$)$_3$ | TiO$_2$ | PtRu | Al$_2$O$_3$(granular) | >100 | <0.05 |
| Comparative Example 2 | — | TiO$_2$ | PtRu | — | >100 | <0.05 |
| Comparative Example 3 | — | MoO$_3$ | PtRu | — | 50 | 0.25 |
| Comparative Example 4 | (NH$_3$)$_6$Mo$_7$O$_{24}$ | TiO$_2$ | PtRu | MoO$_{2.2}$(film-like) | 40 | 0.30 |
| Comparative Example 5 | Na$_2$WO$_4$ | ZrO$_2$ | PtRu | WO$_{2.1}$(film-like) | >100 | <0.05 |
| Comparative Example 6 | — | carbon | PtRu | — | 17 | 0.36 |
| Comparative Example 7 | (NH$_3$)$_6$Mo$_7$O$_{24}$ | carbon | PtRu | MoO$_{2.3}$(granular) | 17 | 0.35 |

In the fuel cells for Comparative Examples 1 and 2, the highest value of the cell resistance exceeded 100 mΩ and the cell voltage was lower than 0.05V.

As apparent from Table 1, the fuel cell for each of Examples 1 to 15 exhibited a low cell resistance. The cell voltage was high, and the fuel cell had excellent the output performance. In particular, where the promoter layers was formed of a Mo oxide, the fuel cell for each of Examples 1 to 8, which used a supported catalyst comprising an oxide carrier containing an oxide of at least one element selected from the group consisting of Ti, Zr, Sn, W, Al, Cr, Nb and Si, had a cell resistance lower than that of the fuel cell for each of Examples 13 and 14 which used a supported catalyst comprising the oxide carrier that did not contain the oxide noted above. From this it can be understood that the cell resistance of the fuel cell for each of Examples 1 to 8 was low because the supported catalyst used in the fuel cell for each of Examples 1 to 8 had good conductivity. Particularly, each of the fuel cell for Example 1, in which the oxide carrier was formed of $TiO_2$, the fuel cell for Example 2, in which the oxide carrier was formed of $ZrO_2$, and the fuel cell for Example 3, in which the oxide carrier was formed of $SnO_2$, exhibited a cell voltage higher than that of the fuel cell for each of Examples 4 to 8 that used other oxide carriers. Thus, the fuel cell for each of Examples 1 to 3 was particularly excellent in the output performance.

On the other hand, the fuel cell for each of Comparative Examples 1 to 5 exhibited a cell resistance higher than that of the fuel cell for each of Examples 1 to 15. In addition, the cell voltage was low so as to make the fuel cell for each of Comparative Examples 1 to 5 poor in the output performance. The fuel cell for each of Comparative Examples 6 and 7 had a lower cell resistance than the fuel cell for each of Examples 1 to 15. However, the cell voltage of the fuel cell for each of Comparative Examples 6 and 7 was low. Therefore, the fuel cell for each of Comparative Examples 6 and 7 had, but poor output performance.

In the supported catalyst used in the fuel cell for Comparative Example 1, a stable Al oxide having a melting point not lower than 1,500° C. was supported on the oxide carrier as in JP-A No. 2003-80077 (KOKAI) mentioned above. The Al oxide was therefore granular. As a result, no nano-hetero structure was obtained. A common interface was not formed or was, if formed, very small. Consequently, the activity, conductivity or stability of the supported catalyst lowered, ultimately degrading the output performance of the fuel cell.

In the fuel cell for each of Comparative Examples 2 and 3, supported catalysts were used, in which promoter layers were not supported on the oxide carrier. The activity, conductivity or stability of the supported catalyst decreased, increasing the cell resistance and inevitably lowering the cell voltage.

In the fuel cell for Comparative Example 4, supported catalysts were used, in which oxide film was formed on oxide carriers and the main catalyst particles were supported on the oxide film formed on the oxide carrier. The supported catalyst had no common interface. Nor did it have a nano-hetero structure. Consequently, the cell resistance increased, lowering the cell voltage.

In the fuel cell for Comparative Example 5, a supported catalyst was manufactured by allowing the main catalyst particles to be supported on a W oxide film formed on the oxide carrier, as in JP-A No. 2004-73991 (KOKAI) mentioned above. The supported catalyst had neither a common interface nor a nano-hetero structure. The cell resistance inevitably rises, lowering the cell voltage.

Carbon was used as the carrier in the supported catalyst used in the fuel cell for Comparative Example 6. Consequently, the supported catalyst, which certainly excelled in conductivity, had low catalytic activity. Since a promoter layers was not formed, the stability of the supported catalyst was lowered, inevitably decreasing the cell voltage.

Carbon was used as carrier in the supported catalyst used in the fuel cell for Comparative Example 7. Consequently, the supported catalyst, which certainly excelled in conductivity, had low catalytic activity. Since the Mo oxide supported by carbon was rendered granular, forming no nano-hetero structure, the cell voltage is lowered. The oxide was granular, perhaps because of the compatibility between carbon and the oxide.

EXAMPLE 16 AND COMPARATIVE EXAMPLE 8

A fuel cell was manufactured as in Example 1, except that the supported catalyst for each of Example 16 and Comparative Example 8 was used in place of the supported catalyst for Example 1. The fuel cell for each of Example 16 and Comparative Example 8 was evaluated as in Example 1, except that an ethanol aqueous solution (concentration of 1M) was used as the fuel. Table 2 shows the results.

EXAMPLE 17 AND COMPARATIVE EXAMPLE 9

A fuel cell was manufactured as in Example 1, except that the supported catalyst for each of Example 17 and Comparative Example 9 was used in place of the supported catalyst for Example 1. The fuel cell for each of Example 17 and Comparative Example 9 was evaluated as in Example 1, except that a formic acid aqueous solution (concentration of 1M) was used as the fuel. Table 2 shows the results.

TABLE 2

| | Metal salt X | Metal salt Y | Carrier | Main catalyst particle | Promoter layer | Fuel | Cell resistance (mΩ) | Cell voltage (V) |
|---|---|---|---|---|---|---|---|---|
| Example 16 | $H_2PtCl_6$ $H_2SnCl_4$ | $(NH_3)_6Mo_7O_{24}$ | $TiO_2$ | PtSn | $MoO_{2.3}$ | ethanol | 20 | 0.22 |
| Comparative Example 8 | $H_2PtCl_6$ $H_2SnCl_4$ | — | carbon | PtSn | — | ethanol | 17 | 0.20 |
| Example 17 | $H_2PtCl_6$ $PdCl_2$ | $(NH_3)_6Mo_7O_{24}$ | $TiO_2$ | PtPd | $MoO_{2.4}$ | formic acid | 20 | 0.35 |
| Comparative Example 9 | $H_2PtCl_6$ $PdCl_2$ | — | carbon | PtPd | — | formic acid | 17 | 0.32 |

The experimental data given in Table 2, covering the use of the ethanol aqueous solution as the fuel, will now be explained.

The fuel cell for Example 16 had a higher cell voltage than the fuel cell for Comparative Example 8. The fuel cell exhibited excellent output performance. Carbon was used as carrier in the supported catalyst used in the fuel cell for Comparative Example 8. As a result, the supported catalyst, which had good conductivity, exhibited low catalytic activity. Since promoter layers were not supported by the carrier, the cell voltage of the fuel cell is considered to have been lowered.

From the experimental data for Example 16, it has been confirmed that the supported catalyst having the nano-hetero structure permits producing high oxidizing activity of ethanol.

The experimental data given in Table 2, covering the use of the formic acid aqueous solution as fuel, will now be explained.

<Manufacture and Evaluation of Fuel Cell>

A fuel cell was manufactured as in Example 1, except that used were the anode and the cathode for each of Examples 18 to 20 and Comparative Examples 10 to 12.

The fuel cell manufactured in each of Examples 18 to 20 and Comparative Examples 10 to 12 was evaluated as in Example 1. Table 3 shows the results.

TABLE 3

|  | Metal salt X | Metal salt Y | Carrier | Main catalyst particle | Promoter layer | Cell resistance (mΩ) | Cell voltage (V) |
| --- | --- | --- | --- | --- | --- | --- | --- |
| Example 18 | $H_2PtCl_6$ | $(NH_3)_6Mo_7O_{24}$ | $TiO_2$ | Pt | $MoO_{2.2}$ | 20 | 0.38 |
| Example 19 | $H_2PtCl_6$ | $H_2RuCl_5$ | $TiO_2$ | Pt | $RuO_{2.1}$ | 20 | 0.37 |
| Comparative Example 10 | $H_2PtCl_6$ | $Na_2WO_4$ | $ZrO_2$ | Pt | $WO_{2.1}$ (film-like) | 90 | 0.10 |
| Comparative Example 11 | $H_2PtCl_6$ | — | carbon | Pt | — | 17 | 0.36 |
| Example 20 | $H_2AuCl_4$ | $(NH_3)_6Mo_7O_{24}$ | $TiO_2$ | Au | $MoO_{2.2}$ | 20 | 0.28 |
| Comparative Example 12 | $H_2AuCl_4$ | — | carbon | Au | — | 17 | 0.15 |

The cell voltage of the fuel cell for Example 17 was higher than that of the fuel cell for Comparative Example 9. Therefore, the fuel cell has excellent output performance. Carbon was used as carrier in the supported catalyst used in the fuel cell for Comparative Example 9. As a result, the supported catalyst, which certainly had high conductivity, exhibited low catalytic activity. Since the promoter layers were not supported by the carrier, the cell voltage of the fuel cell lowered.

The experimental data for Example 17 reveals that the supported catalyst of the nano-hetero structure had high oxidizing activity of formic acid.

EXAMPLES 18 TO 20 AND COMPARATIVE EXAMPLES 10 TO 12

<Preparation of Anode>

First, 3 g of the supported catalyst for Comparative Example 6, 8 g of pure water, 15 g of a 20% Nafion solution, and 30 g of 2-ethoxy ethanol were sufficiently stirred. They are then dispersed by using a desk-top ball mill so as to prepare a slurry composition. A carbon paper (350 μm, manufactured by Toray Inc.), which had been subjected to a water-repelling treatment, was coated with the slurry composition by a control coater. The slurry composition was dried, manufacturing an anode. The anode was loaded with the supported catalyst at a loading density of 3 mg/cm$^2$.

<Preparation of Cathode>

First, 2 g of the supported catalyst for Example 18, 5 g of pure water, 5 g of a 20% Nafion solution, and 20 g of 2-ethoxy ethanol were sufficiently stirred. They are then dispersed by using a desk-top ball mill, preparing a slurry composition. A carbon paper (350 μm, manufactured by Toray Inc.), which had been subjected to a water-repelling treatment, was coated with the slurry composition by a control coater. They slurry composition was dried, manufacturing a cathode. The cathode was loaded with the supported catalyst at a loading density of 2 mg/cm$^2$.

A cathode for each of Examples 19, 20 and Comparative Examples 10 to 12 was manufactured as in Example 18, except that the supported catalyst for each of Examples 19, 20 and Comparative Examples 10 to 12 was used in place of the supported catalyst for Example 18.

The experimental data in Table 3, covering the use of the main catalyst particles formed of Pt, will be explained.

The fuel cell for each of Examples 18 and 19 exhibited a high cell voltage and excellent output performance.

On the other hand, the fuel cell for Comparative Example 10 exhibited higher cell resistance that of the fuel cell for each of Examples 18 and 19 but had lower cell voltage. The fuel cell had but low output performance. In the supported catalyst used in the cathode of the fuel cell for Comparative Example 10, the main catalyst particles were supported on an oxide film covering the surface of the oxide carrier, as in JP-A No. 2004-73991 (KOKAI) previously referred to. No common interface was formed, and no nano-hetero structure was obtained. The cell resistance inevitably rose, lowering the cell voltage.

The fuel cell for Comparative Example 11 was inferior to the fuel cell for each of Examples 18 and 19 in terms of cell voltage and output performance. Carbon was used as carrier in the supported catalyst used in the cathode of the fuel cell for Comparative Example 11. Consequently, the supported catalyst, which had indeed high conductivity, exhibited low catalytic activity. Since the promoter layer was not supported by the carrier, the fuel cell had its cell voltage lowered.

The experimental data in Table 3, covering the use of the main catalyst particles formed of Au, will be explained.

The fuel cell for Example 20 exhibited high cell voltage and excellent output performance.

On the other hand, the fuel cell for Comparative Example 12 exhibited lower cell voltage than the fuel cell for Example 20 and, thus, had poor output performance. Carbon was used as carrier in the supported catalyst used in the cathode of the fuel cell for Comparative Example 12. As a result, the supported catalyst, which certainly exhibited high conductivity, had low catalytic activity. Since a promoter layer was not supported by the carrier, the cell voltage of the fuel cell had lowered.

The experimental data for Examples 18 to 20 reveals that the nano-hetero structure had resulted in the oxygen reducing activity.

Where the main catalyst particles were formed of Pt, the cell voltage of the fuel cell for Example 18 was higher by 0.02V than that of the fuel cell using the supported catalyst for Comparative Example 11 in which carbon was used as the carrier. On the other hand, where the main catalyst particles were formed of Au, the cell voltage of the fuel cell for Example 20 was higher by 0.13V than that of the fuel cell using the supported catalyst for Comparative Example 12 in which carbon was used as the carrier. The cell voltage prominently rose when the main catalyst particles were formed of Au. Where the main catalyst particles were formed of Au, the cell voltage was lower than in the case where the main catalyst particles were formed of Pt. However, further improvement in the catalytic activity can be expected by, for example, allowing the Au particles to form a cluster.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A supported catalyst, comprising:
    an oxide carrier;
    catalyst particles supported on the oxide carrier;
    catalyst layers supported on the oxide carrier, containing an oxide or a composite oxide which includes at least one element selected from the group consisting of Mo, W, Sn and Ru, and having a melting point lower than 1,500°C., each of the catalyst layers locating among the catalyst particles; and
    interface portions among the oxide carrier, the catalyst particles and the catalyst layers.

2. The supported catalyst according to claim 1, wherein the catalyst layers contain an oxide or a composite oxide which includes Mo, and the oxide carrier contains an oxide or a composite oxide which includes at least one element selected from the group consisting of Ti, Zr, Sn, W, Al, Cr, Nb and Si.

3. The supported catalyst according to claim 1, wherein the catalyst layers contain an oxide or a composite oxide which includes at least one element selected from the group consisting of W, Sn and Ru, and the oxide carrier contains an oxide or a composite oxide which includes Mo.

4. The supported catalyst according to claim 1, wherein the catalyst layers have an average thickness not larger than 3 nm.

5. The supported catalyst according to claim 1, wherein the catalyst layers have an average thickness of 0.2 to 3 nm.

6. The supported catalyst according to claim 1, wherein the catalyst layers have a melting point not lower than 500°C. and lower than 1,500°C.

7. The supported catalyst according to claim 1, wherein:
    the catalyst layers contain $MoO_x$, where the molar ratio x falls within a range of 1 to 3; and
    the oxide carrier contains an oxide or a composite oxide which includes at least one element selected from the group consisting of Ti, Zr, Sn, W, Al, Cr, Nb and Si.

8. The supported catalyst according to claim 7, wherein the oxide carrier contains at least one oxide selected from the group consisting of $TiO_2$, $ZrO_2$, $SnO_2$, $WO_3$, $Al_2O_3$, $Cr_2O_3$, $Nb_2O_5$ and $SiO_{02}$.

9. The supported catalyst according to claim 1, wherein:
    the catalyst layers contain at least one oxide selected from the group consisting of $RuO_x$, $WO_x$, and $SnO_x$, where the molar ratio x falls within a range of 1 to 3; and
    the oxide carrier contains an oxide or a composite oxide which includes Mo.

10. The supported catalyst according to claim 9, wherein the oxide carrier contains $MoO_3$.

11. A fuel cell, comprising an anode, a cathode, and a proton conductive membrane provided between the anode and the cathode, wherein at least one of the anode and the cathode comprises:
    an oxide carrier;
    catalyst particles supported on the oxide carrier;
    catalyst layers supported on the oxide carrier, containing an oxide or a composite oxide which includes at least one element selected from the group consisting of Mo, W, Sn and Ru, and having a melting point lower than 1,500°C., each of the catalyst layers locating among the catalyst particles; and
    interface portions among the oxide carrier, the catalyst particles and the catalyst layers.

12. The fuel cell according to claim 11, wherein the catalyst layers contain an oxide or a composite oxide which includes Mo, and the oxide carrier contains an oxide or a composite oxide which includes at least one element selected from the group consisting of Ti, Zr, Sn, W, Al, Cr, Nb and Si.

13. The fuel cell according to claim 11, wherein the catalyst layers contain an oxide or a composite oxide which includes at least one element selected from the group consisting of W, Sn and Ru, and the oxide carrier contains an oxide or a composite oxide which includes Mo.

14. The fuel cell according to claim 11, wherein the catalyst layers have an average thickness not larger than 3 nm.

15. The fuel cell according to claim 11, wherein the catalyst layers have an average thickness of 0.2 to 3 nm.

16. The fuel cell according to claim 11, wherein the catalyst layers have a melting point not lower than 500°C. and lower than 1,500°C.

17. The fuel cell according to claim 11, wherein:
    the catalyst layers contain $MoO_x$, where the molar ratio x falls within a range of 1 to 3; and
    the oxide carrier contains an oxide or a composite oxide which includes at least one element selected from the group consisting of Ti, Zr, Sn, W, Al, Cr, Nb and Si.

18. The fuel cell according to claim 17, wherein the oxide carrier contains at least one oxide selected from the group consisting of $TiO_2$, $ZrO_2$, $SnO_2$, $WO_3$, $Al_2O_3$, $Cr_2O_3$, $Nb_2O_5$ and $SiO_2$.

19. The fuel cell according to claim 11, wherein:
    the catalyst layers contain at least one oxide selected from the group consisting of $RuO_x$, $WO_x$, and $SnO_x$, where the molar ratio x falls within a range of 1 to 3; and
    the oxide carrier contains an oxide or a composite oxide which contains Mo.

20. The fuel cell according to claim 19, wherein the oxide carrier contains $MoO_3$.

* * * * *